(12) United States Patent
Bhattacharjee et al.

(10) Patent No.: US 9,394,402 B2
(45) Date of Patent: Jul. 19, 2016

(54) GLYCOLIDE-BASED POLYESTERS MADE WITH ISOSORBIDE

(71) Applicant: Dow Global Technologies LLC, Midland, MI (US)

(72) Inventors: Debkumar Bhattacharjee, Blue Bell, PA (US); Kalyan Sehanobish, Sanford, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/653,701

(22) PCT Filed: Dec. 18, 2013

(86) PCT No.: PCT/US2013/076267
§ 371 (c)(1),
(2) Date: Jun. 18, 2015

(87) PCT Pub. No.: WO2014/100260
PCT Pub. Date: Jun. 26, 2014

(65) Prior Publication Data
US 2015/0337095 A1    Nov. 26, 2015

Related U.S. Application Data

(60) Provisional application No. 61/740,150, filed on Dec. 20, 2012.

(51) Int. Cl.
| | | |
|---|---|---|
| *C08G 64/00* | (2006.01) | |
| *C08G 63/60* | (2006.01) | |
| *C08G 63/664* | (2006.01) | |
| *C08L 67/04* | (2006.01) | |
| *B29C 47/00* | (2006.01) | |
| *C08J 5/18* | (2006.01) | |
| *C08G 63/66* | (2006.01) | |
| *C08L 67/00* | (2006.01) | |
| *C08G 63/02* | (2006.01) | |
| *B29K 67/00* | (2006.01) | |
| *B29L 7/00* | (2006.01) | |

(52) U.S. Cl.
CPC ............ *C08G 63/60* (2013.01); *B29C 47/0021* (2013.01); *C08G 63/66* (2013.01); *C08G 63/664* (2013.01); *C08J 5/18* (2013.01); *C08L 67/00* (2013.01); *C08L 67/04* (2013.01); *B29K 2067/00* (2013.01); *B29L 2007/008* (2013.01); *C08J 2367/00* (2013.01); *C08J 2367/04* (2013.01); *C08L 2201/14* (2013.01); *C08L 2203/16* (2013.01)

(58) Field of Classification Search
CPC ................................ C08L 67/04; C08G 63/08
USPC .................................. 525/411; 528/271, 272
See application file for complete search history.

(56) References Cited

U.S. PATENT DOCUMENTS

| | | | |
|---|---|---|---|
| 5,958,581 A | 9/1999 | Khanarian et al. | |
| 6,342,300 B1 * | 1/2002 | Bengs ................... | C08G 63/60 424/489 |
| 8,083,064 B2 | 12/2011 | Boswell et al. | |
| 8,268,954 B2 * | 9/2012 | Schroeder ............ | C08G 64/323 514/471 |
| 2002/0115817 A1 | 8/2002 | Hayes | |
| 2006/0009611 A1 | 1/2006 | Hayes | |
| 2007/0100122 A1 | 5/2007 | Crawford et al. | |
| 2010/0143709 A1 | 6/2010 | Baer et al. | |
| 2012/0264047 A1 | 10/2012 | Farrugia et al. | |
| 2013/0095263 A1 | 4/2013 | Carman, Jr. et al. | |

FOREIGN PATENT DOCUMENTS

| | | | |
|---|---|---|---|
| CN | 102718955 A | 10/2012 | |
| EP | 0620245 A1 | 10/1994 | |
| EP | 1535943 A1 | 6/2005 | |
| EP | 1752482 * | 2/2007 | |
| EP | 1752482 A1 | 2/2007 | |
| GB | 1164374 A | 9/1969 | |
| JP | 2005325170 A | 11/2005 | |
| JP | 2006028324 A | 2/2006 | |
| JP | 2006096845 * | 4/2006 | ............. C08G 63/60 |
| JP | 2006096845 A | 4/2006 | |
| JP | 2008075068 A | 4/2008 | |
| JP | 2010280767 A | 12/2010 | |
| WO | 99/54119 A1 | 10/1999 | |
| WO | 2009135921 A1 | 11/2009 | |
| WO | 2010077133 A1 | 7/2010 | |
| WO | 2010140599 A1 | 12/2010 | |

OTHER PUBLICATIONS

Dechy-Cabaret, Chem. Rev., 2004, vol. 104, p. 6147-6176.
Fox, Bull. Am. Physics Soc., 1956, vol. 1, No. 3, p. 123.
Gautier, J. Polym. Sci. Part A: Polym. Chem., 2009, vol. 47, p. 1440-1449.
Kamber, Chem. Rev., 2007, vol. 107, p. 5813-5840.
Khrouf, Macromol Chem. Phys., 1998, vol. 199, p. 2755-2765.
Lee, J. Polym Sci Part A: Polym Chem., 2011, vol. 49, p. 3759-3768.
PCT/US2013/076268, Jun. 26, 2014, International Search Report and Written Opinion.
PCT/US2013/076268, Jul. 2, 2015, International Preliminary Report on Patentability.
Okada, Polymer Preprints, American Chemical Society, 1998, vol. 39, No. 2, p. 152-153.

* cited by examiner

*Primary Examiner* — Terressa Boykin

(57) ABSTRACT

A polymer comprises reaction product of (a) one or more diacid, diester thereof, or glycolide, and (b) one or more polyol, wherein component (a) comprises glycolide or combinations thereof, and component (b) consists essentially of isosorbide. A film or sheet having one or more layers, wherein at least one layer comprising a polymer comprises reaction product of (a) one or more diacid, diester thereof, or glycolide, and (b) one or more polyol, wherein component (a) comprises glycolide or combinations thereof, and component (b) consists essentially of isosorbide.

10 Claims, No Drawings

GLYCOLIDE-BASED POLYESTERS MADE WITH ISOSORBIDE

FIELD OF THE INVENTION

This invention relates to polyester polymers comprising the reaction products of (a) glycolide, and (b) one or more polyol, wherein component (a) comprises glycolide, and component (b) consists essentially of isosorbide. The invention further relates to compositions which comprise blends of such polymer, and articles, such as single- and multi-layer films, made with such polymers.

BACKGROUND

Polyethylene terephthalate (PET) is widely used in both flexible and rigid packaging. There is a need to provide polymer films with improved barrier properties to oxygen, carbon dioxide and moisture to accommodate increasing demands in lighter weighting of bottles, simpler designs, and longer shelf life of packaged food, including produce, meat, fish, and cheese and other dairy products. In addition, with the emphasis on technologies based on sustainable chemistry, there has been increased interest in films based on monomers from renewable sources, such as polyethylene furanoate based on furan dicarboxylic acid, which can be produced using bio-derived compounds, such as fructose.

Several new polymers with high barrier properties have been developed from either renewable or non-renewable resources and some of these have already been commercialized. These include polyethylene naphthalate (PEN), polyglycolic acid (PGA), and polyethylene furanoate (PEF). For those polymers, the oxygen barrier property (at about 23° C. and 50% relative humidity) follows the order:

PGA~EVOH>PEN~PEF>PET

Compared to PET, PEF has been reported to have six times improved oxygen barrier, two times improved barrier to carbon dioxide, and also improved moisture barrier. "Bioplastics, Reshaping the Industry", Las Vegas, Feb. 3, 2011.

In WO 2010/0177133 (Sipos, assigned to Furanix Technologies B.V.), a process for the production of PEF polymers and copolymers made from 2,5-furandicarboxylate is disclosed. The (co)polymers have a number average molecular weight of at least 10,000 (as determined by GPC based on polystyrene standards), and an absorbance below 0.05 (as a 5 mg/ml solution in a dichlomethane : hexafluoroisopropanol 8:2 mixture at 400 nm). These (co)polymers may be subjected to solid state polycondensation and then attain a number average molecular weight greater than 20,000 (as determined by GPC based on polystyrene standards), without suffering from discoloration.

There remains a need for novel polymers which can be used to form films in a cost-effective manner that exhibit a desirable balance of properties, such as improved oxygen, carbon dioxide, and water-vapor permeability, higher glass transition temperature (Tg), and improved toughness, chemical, heat and impact resistance. There is, further, a need for novel polymers which can used to form films with high-temperature heat sealability using alternative sealing technologies.

The present invention achieves these objectives by forming a film from a component (a) wherein component (a) comprises oglycolide, and component (b) consists essentially of isosorbide, by trans-esterification, in presence of suitable catalysts, followed by further polycondensation at higher temperature and optionally at reduced pressure, and using solid state polymerization to increase the molecular weight.

SUMMARY OF THE INVENTION

The present invention relates to polymers comprising reaction product of (a) one or more diacid or diester thereof, and (b) one or more polyol, wherein component (a) comprises glycolide, and component (b) consists essentially of isosorbide. Component (b) may comprise other polyols, but preferably component (b) consists of isosorbide.

Component (a) may further comprise one or more $C_1$ to $C_{10}$ alkyl ester of 2,5-furan dicarboxlic acid (FDCA), one or more $C_1$ to $C_{10}$ alkyl ester of 2,6-napthalene dicarboxylic acid (NDCA), or combinations thereof. The component (a) may comprises 2 to 98 mole % glycolide, and 2 to 98 mole % $C_1$ to $C_{10}$ alkyl esters of FDCA or NDCA, or combinations thereof, based on the total weight of component (a).

The present invention further comprises a composition comprising (1) a first polymer wherein component (a) comprises glycolide, and component (b) consists essentially of isosorbide, (2) and one or more second polymer selected from the group consisting of (A) polymers made from the same classes of reactants, but different reactants from those use to make the first polymer (e.g., isosorbide and glycolide with no or a different set of esters, depending on what reactants were used in (1)) and (B) other polyesters which are reaction product of component (i) acids, esters or glycolide, and component (ii) polyols, wherein (x) component (i) does not include glycolide when component (ii) is isosorbide, and (y) wherein component (ii) does not include isosorbide when component (i) is glycolide.

The composition may comprise at least one first polymer which is the reaction product of glycolide and at least one second polymer is the reaction product of glycolide and one or more $C_1$ to $C_{10}$ alkyl ester of FDCA or NDCA different from any such esters present in the first polymer. The composition may comprise one or more other polyester which comprise a reaction product of component (i) and component (ii), where component (i) is selected from the group consisting of FDCA, one or more $C_1$ to $C_{10}$ alkyl ester thereof, NDCA, $C_1$ to $C_{10}$ alkyl ester thereof, or combinations thereof, and component (ii) is one or more polyol comprising a mixture of 1,3-cyclohexanedimethanol and 1,4-cyclohexanedimethanol, or 2,2,4,4-tetramethyl-1,3-cyclobutanediol, or combinations thereof.

The other polyester may also comprise aliphatic homopolymer polyglycolide or polyglycolic acid (PGA), polylactic acid (PLA), polycaprolactone (PCL), copolymer polyethylene adipate (PEA), polyhydroxyalkanoate (PHA), polyethylene terephthalate (PET), semi-aromatic copolymer PET, polybutylene terephthalate (PBT), polytrimethylene terephthalate (PTT), polyethylene naphthalate (PEN), and aromatic copolymers from polycondensation of 4-hydroxybenzoic acid and 6-hydroxynaphthalene-2-carboxylic acid.

The invention further comprises an article comprising one or more polymers comprising the reaction product of (a) glycolide, and (b) a polyol, wherein component (a) comprises glycolide, and component (b) consists essentially of isosorbide.

The invention comprises a film or sheet of one or more layers, wherein at least one layer comprises polymer comprising the reaction product of (a) one or more diacid, diester thereof, or glycolide, and (b) a polyol, wherein:
component (a) comprises glycolide, and
component (b) consists essentially of isosorbide.

The invention further includes methods of forming films or sheets comprising the steps of (i) extruding a polymer to form an extrudate; (ii) shaping the extrudate by passing it through a flat or annular die; and (iii) cooling the extrudate to form a film or sheet having a machine direction and a cross direction, wherein the polymer comprises the the reaction product of (a) one or more diacid, diester thereof, or glycolide, and (b) a polyol, wherein: component (a) comprises glycolide, and component (b) consists essentially of isosorbide. The methods may comprise the further step of orienting the film or sheet in the machine or cross direction, or both.

The invention further comprises a barrier film comprising a polyester-based polymer with (a) an $O_2$ gas permeability of 0.4 cc-mil/100 in.$^2$ 24 hrs atm (8 cc 20 µ/m$^2$ 24 hrs atm) at 50% relative humidity (ASTM D-3985) or less, (b) a moisture permeability of 0.5 g mil/100 in.$^2$ 24 hrs atm (9.8 g 20 µ/m$^2$ 24 hrs atm) at 38° C. (ASTM F-1249) or less, and (c) a glass transition temperature (Tg) of 100° C. or higher. The barrier film may further have one or more of the following:

(x) a Falling dart drop impact (Type A) of 200 g or greater (ASTM D-1709) for a 50 µm thick film material at room temperature and 50% relative humidity;

(y) an Elmendorf tear of 400 g or greater (ASTM D-1922) for a 50 µm thick film material at room temperature and 50% relative humidity; or (z) a notched Izod impact of 1.0 J/cm or greater at room temperature and 50% relative humidity (ASTM D-256 for rigid materials).

DETAILED DESCRIPTION OF THE INVENTION

The present invention provides cost-effective polymers that exhibit a desirable balance of properties, relative to PEF polymers, including improved oxygen, carbon dioxide, and water-vapor permeability, higher glass transition temperature (Tg), and improved chemical, heat and impact resistance. In addition, these polymers can be used to form films with high-temperature heat sealability using alternative sealing technologies.

The polymers of the present invention comprise the reaction product of (a) one or more diacid or diester thereof, and (b) one or more polyol, wherein component (a) comprises glycolide, and component (b) consists essentially of isosorbide. The component (a) may consist essentially of glycolide, or it may consist of glycolide. Glycolic acid may be used as a precursor to form glycolide which can then be used as component (a) to form the polymers of the present invention.

Component (a) may further comprise other diesters, for example, one or more $C_1$ to $C_{10}$ alkyl ester of FDCA or of NDCA, or combinations thereof. Suitable diesters include dimethyl furanoate (DMF) and dimethyl naphthanoate (DMN). The component (a) may comprise 2 to 98 mole % glycolide, and 2 to 98 mole % $C_1$ to $C_{10}$ alkyl esters of FDCA or NDCA, or combinations thereof, based on the total weight of component (a). Preferably, component (a) comprises 90 mole %, or 95 mole %, or 98 mole %, or 99 mole % or 100 mole % glycolide, based on the total amount of component (a).

It can be desirable to prepare polymers with FDCA, NDCA, DMF, DMN and other diacids or diesters. When such other diacids or diesters are used as component (a), they preferably comprise less than 30 mole %, or less than 20 mole %, or less than 10 mole %, or less than 5 mole %, or less than 2 mole % or less than 1 mole % FDCA, $C_1$ to $C_{10}$ alkyl diester thereof (e.g., DMF), or combinations thereof, NDCA, $C_1$ to $C_{10}$ alkyl diester thereof (e.g., DMN), or combinations thereof, based on the total amount of component (a). When the diacids are used, they are preferably present at low levels, preferably less than 5 mole %, or less than 2 mole % or less than 1 mole % based on the total amount of component (a).

Component (a) may comprise up to 100 mole % of glycolide, based on the total amount of component (a). This portion of component (a) may comprise 1 mole % or more, or 5 mole % or more, or 10 mole % or more of glycolide; and may contain 99 mole % or less, or 95 mole % or less, or 90 mole % of less of one or more glycolide.

Range endpoints and ranges disclosed herein are inclusive and independently combinable (e.g., ranges of "up to 95 mole %, or, more specifically, 10 mole % to 90 mole %", is inclusive of the endpoints and all intermediate values of the ranges of "10 mole % to 95 mole %," etc).

If component (a) is not all or substantially all glycolide, the polymer may be formed from component (a) comprising 1 to 50 mole % FDCA, $C_1$ to $C_{10}$ alkyl diester thereof, and 1 to 50 mole % NDCA, $C_1$ to $C_{10}$ alkyl diesters thereof, or combinations thereof. For example, the polymer may be formed from diesters comprising 1 to 40 mole % of $C_1$ to $C_{10}$ alkyl diesters of FDCA, such as DMF, and 1 to 40 mole % of $C_1$ to $C_{10}$ alkyl diesters of NDCA, such as DMN, based on the total amount of component (a). Preferably, the component (a) diacid(s) or diester(s) is made up exclusively of glycolide and other suitable diester(s). However, component (a) may also comprise a mixture of diacid(s) and diester(s). When component (a) has a mixture of diacid(s) and diester(s), the diacid is preferably present at relatively low amounts, for example, 20 or 10, or 5, or 1, or 0.5, or 0.1 mole % based on the total amount of component (a). For example, component (a) may comprise 90 mole % glycolide and 10 mole % diesters of NDCA or FDCA, or combination thereof. As component (a) may comprise a mixture of glycolide and diesters, the alternate form diacid(s) may also be a mixture and are not necessarily the counterpart diacid. For example, component (a) may comprise a predominant amount of glycolide with a smaller amount of diester of FDCA with or without a low level of FDCA and./or NDCA; or with a smaller amount of diester of NDCA with or without a low level of FDCA and./or NDCA.

The term "GLA-based polymer" refers to polymers made from either glycolic acid or glycolide (or both). As described herein, such GLA-based polymers may comprise residues of other diacids and diesters as well.

The polyol, component (b) may consist of isosorbide or may consist essentially of isosorbide. When component (b) contains other polyols besides just isosorbide, component (b) may comprise ethylene glycol, a mixture of 1,3-cyclohexanedimethanol and 1,4-cyclohexanedimethanol, or 2,2,4,4-tetramethyl-1,3-cyclobutanediol, or combinations thereof. The polyol component (b) preferably comprises 100 mole % isosorbide, based on the total amount of component (b), or up to 99 mole %, or up to 95 mole %, or up to 90 mole %, or up to 80 mole % or up to 70 mole % isosorbide, or at least 1 mole %, at least 5 mole %, at least 10 mole %, at least 20 mole %, or at least 30 mole % isosorbide. For example, component (b) may comprise 10 to 90 mole %, based on the total amount of component (b) polyol, of isosorbide, and 10 to 90 mole % based on the total amount of component (b) polyol, of ethylene glycol, a mixture of 1,3-cyclohexanedimethanol and 1,4-cyclohexanedimethanol, or 2,2,4,4-tetramethyl-1,3-cyclobutanediol, or other polyols, or combinations thereof.

When component (b) contains a mixture of 1,3- and 1,4-cyclohexanedimethanol, the cyclohexanedimethanol may comprise 25 to 75 mole % of 1,3-cyclohexanedimethanol and 25 to 75 mole % of 1,4-cyclohexanedimethanol. As an example, the cyclohexanedimethanol may comprise 45 to 65 mole % of 1,3-cyclohexanedimethanol and 35 to 55 mole % of 1,4-cyclohexanedimethanol. As a further example, the cyclohexanedimethanol may comprise 55 mole % of 1,3-cyclohexanedimethanol and 45 mole % of 1,4-cyclohexanedimethanol.

The invention further includes compositions comprising (1) one or more first polymer comprising reaction product of (a) glycolide, and (b) one or more polyol, wherein component (b) comprises isosorbide, and (2) one or more second polymer selected from the group consisting (A) of polymers of (1) above different from the first polymer and (B) other polyesters which are reaction product of (i) diacids or diesters and (ii) polyols, wherein (x) the acids and esters do not include glycolide when the polyol is isosorbide, and (y) wherein the polyols do not include isosorbide when the component (i) is glycolide. This composition may comprise two or more polymers, wherein at least one polymer is the reaction product of glycolde, and at least one other polymer is the reaction product of $C_1$ to $C_{10}$ alkyl diester of NDCA, $C_1$ to $C_{10}$ alkyl alkyl diester of FDCA, or combinations thereof.

The composition may comprise one or more other polyester comprising a reaction product of component (i) glycolide, and component (ii) one or more polyol comprising a mixture of 1,3- and 1,4-cyclohexanedimethanol, or 2,2,4,4-tetramethyl-1,3-cyclobutanediol, or combinations thereof. For the composition described in the previous sentence, since the polyol component contains a mixture of 1,3- and 1,4-cyclohexanedimethanol, or 2,2,4,4-tetramethyl-1,3-cyclobutanediol, the polyol cannot be solely isosorbide or ethylene glycol.

The polymers of the present invention have a glass transition temperature (Tg) of at least 100° C. as measured by differential scanning calorimetry (DSC) or calculated according to the Fox Equation (see, T. G. Fox, Bull. Am. Physics Soc., vol. 1(3), p. 123 (1956)). Preferably, the Tg of the polymers is in the range from 100 to 150° C., or 110 to 150° C., or 120 to 150° C. Polymers with Tg of 100° C. or higher, and preferably 120° C. or higher, and the films, sheets and articles made from them, exhibit desirable physical characteristics as described elsewhere herein.

The polymers and copolymers described above may be prepared by known methods. WO 2010/0177133, referenced above, teaches methods to make these polyesters, and produce them at high molecular weights and without discoloration. The method of WO 2010/0177133 is applicable to preparing the present polymers using glycolide alone or together with suitable amounts of FDCA or DMF, NDCA or DMN, or $C_2$ to $C_{10}$ alkyl diesters of FDCA or NDCA, or combinations thereof.

For example, the polymers of the present invention may be made by a two-step process, wherein first, in Step (I), a prepolymer is made having glycolide moieties within the polymer backbone. This intermediate product is preferably an ester composed of two diol monomers and one glycolide monomer, followed by a melt-polymerization of the prepolymers under suitable polymerization conditions. Such conditions typically involve reduced pressure to remove the excess of diol monomers. Using glycolide and DMF as examples of the diester, in Step (I) glycolide and DMF are reacted in a catalyzed transesterification process with about 2 equivalents of a diol, to generate the prepolymer while removing 2 equivalents of the corresponding alcohol. With glycolide, this transesterification step generates no alcohol. With DMF and DMN, this transesterification step generates methanol, a volatile alcohol that is easy to remove. As starting material for use along with glycolide, diesters of FDCA and NDCA with other volatile alcohols or phenols (e.g., having a boiling point at atmospheric pressure of less than 150° C., preferably less than 100° C., more preferably of less than 80° C.) may be used as well. Examples, therefore, include ethanol, methanol and a mixture of ethanol and methanol. The reaction leads to formation of a polyester. As discussed in more detail below, the diol monomers may contain additional hydroxyl groups, such as glycerol, pentaerythritol or sugar alcohols.

Step (I) is commonly referred to as esterification when acid is used, and trans-esterification when ester is used, with concomitant removal of water or an alcohol, respectively, or no by-product when glycolide is used. Step (II) of the process is a catalyzed polycondensation step, wherein the prepolymer is polycondensed under reduced pressure, at an elevated temperature and in the presence of a suitable catalyst.

The first step, transesterification, is catalyzed by a specific transesterification catalyst at a temperature preferably in the range of about 150 to about 220° C., more preferably in the range of about 180 to about 200° C., and carried out until the starting ester content is reduced until it reaches the range of about 3 mole % to about 1 mole %. The transesterification catalyst may be removed, to avoid interaction in the second step of polycondensation, but often remains present for the second step. The selection of the transesterification catalyst can be affected by the selection of the catalyst used in the polycondensation step, and vice versa.

Suitable catalysts for use in the Step (I) transesterification process include tin(IV) based catalysts, preferably organotin (IV) based catalysts, more preferably alkyltin(IV) salts including monoalkyltin(IV) salts, dialkyl and trialkyltin(IV) salts and mixtures thereof. The tin(IV) based catalysts are better than tin(II) based catalysts, such as tin(II) octoate.

The tin(IV) based catalysts may also be used with alternative or additional transesterification catalysts. Examples of alternative or additional transesterification catalysts that may be used in Step (I) include one or more of titanium(IV) alkoxides or titanium(IV) chelates, zirconium(IV) chelates, or zirconium(IV) salts (e.g. alkoxides); hafnium(IV) chelates or hafnium(IV) salts (e.g. alkoxides). Although these alternative or additional catalysts may be suitable for the transesterification, they may actually interfere during the polycondensation step. Therefore, preferably, the main or sole transesterification catalyst is a tin(IV) based catalyst. Alternatively, when alternative or additional catalysts are used, they are removed after Step (I) and before Step (II).

Preferred transesterification catalysts are selected from one or more of, butyltin(IV) tris(octoate), dibutyltin(IV) di(octoate), dibutyltin(IV) diacetate, dibutyltin(IV) laureate, bis (dibutylchlorotin(IV)) oxide, dibutyltin dichloride, tributyltin(IV) benzoate and dibutyltin oxide.

In respect to the catalyst, it should be realized that the active catalyst as present during the reaction may be different from the catalyst as added to the reaction mixture. The catalysts are used in an amount of about 0.01 to about 0.2 mole % relative to initial diester, more preferably in an amount of about 0.04 to about 0.16 mole % of initial diester.

The intermediate product (i.e., the prepolymer) may, but importantly need not be isolated and/or purified. Preferably, the product is used as such in the subsequent polycondensation step. In this catalyzed polycondensation step, the prepolymer is polycondensed under reduced pressure, at an elevated temperature and in the presence of a suitable catalyst. The temperature is preferably in the range of about the melting point of the polymer to about 30° C. above this melting point, but preferably not less than about 180° C. The pressure should be reduced, preferably gradually at stages. It should preferably be reduced to as low as a pressure as possible, more preferably below 1 mbar. Step (II) is catalyzed by specific polycondensation catalysts and the reaction is carried out at mild melt conditions.

Examples of suitable polycondensation catalysts for use in Step (II) include tin(II) salts, such as tin(II) oxide, tin(II) dioctoate, butyltin(II) octoate, or tin(II) oxalate. Preferred catalysts are tin(II) salts obtained by the reduction of the tin(IV) catalyst, e.g., alkyltin(IV), dialkyltin(IV), or trialkyltin(IV) salts, used as transesterification catalyst in Step (I), with a reducing compound. Reducing compounds used may be well-known reducing compounds, preferably phosphorus compounds.

Particularly preferred reducing compounds are organophosphorus compounds of trivalent phosphorus, in particular a monoalkyl or dialkyl phosphinate, a phosphonite or a phosphite. Examples of suitable phosphorus compounds are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, di(2,4-di-tert-butylphenyl) pentaerythritol diphosphite, tristearylsorbitol triphosphite, tetrakis(2,4-di-tert-butylphenyl) 4,4'-diphenylenediphosphonite, 4,4'-isopropylidenediphenol $C_{12}$-$C_{15}$ alkyl phosphite, poly(dipropylene glycol) phenyl phosphite, tetraphenyl dipropylene glycol phosphite, tetraphenyl diisopropylene glycol phosphite, trisisodecyl phosphite, diisodecyi-phenyl phosphite, diphenyl isodecyl phosphite, and mixtures thereof.

The preferred polycondensation catalysts therefore include tin(II) salts such as tin(II) dioctoate, butyl(II) octoate and other alkyltin(II) octoate compounds, prepared from the corresponding tin(IV) salt using e.g., a trialkyl phosphite, a monoalkyl diaryl phosphite, a dialkyl monoaryl phosphite or a triaryl phosphite. Preferably, the reducing compound is added in the melt of the prepolymer. Addition of the reducing compound at that stage avoids discoloration.

A combination of transesterification catalyst and polycondensation catalyst that may be particularly suitable, is based on a tin(IV) type catalyst during transesterification, which is reduced, preferably with triphenylphosphite and/or tris(nonylphenyl)phosphite, to a tin(II) type catalyst during the polycondensation. The catalysts are used in an amount of about 0.01 to about 0.2 mole % relative to initial diester, more preferably in an amount of about 0.04 to about 0.16 mole % of initial diester.

It is particularly useful that the combination of tin(IV) type catalyst and tin(II) type catalyst retains activity. This allows for the same catalyst to be used for a subsequent solid state polycondensation. Solid state polycondensation (SSP) is a common process used in the preparation of other polyesters, such as PET. In SSP processes, pellets, granules, chips or flakes of polymer are subjected for a certain amount of time to elevated temperatures (below melting point) in a hopper, a tumbling drier or a vertical tube reactor or the like. With tin(IV)/tin(II) catalyst systems, higher molecular weight can be reached than with titanium catalysts. Tin type catalysts allow SSP of the glycolide-based polymers to reach a number average molecular weight of 20,000 and greater. Conditions and equipment for SSP are known, in particular as SSP is frequently used to upgrade recycled PET. In applying the SSP process to these polymer systems, the temperature should be elevated relative to traditional SSP processes (as for PET), but nonetheless remain below, and preferably well below, the melting point of the polymer.

Polyesters and various copolymers may be made according to the process described above, depending on the selection of the monomers used. Furthermore, the copolymers may be formed as random or block copolymers depending on the process and process conditions employed. For instance, linear polyesters may be made with glycolide and isosorbide and an aromatic, aliphatic or cycloaliphatic diol. The $C_1$ to $C_{10}$ alkyl diesters of FDCA and/or NDCA may be used in combination with one or more glycolide and other dicarboxylic acid esters or lactones. Likewise, the diol may be a combination of two or more diols.

Polyesters that have never been produced before and that are claimed in this application are those having both a glycolide moiety and isosorbide within the polymer backbone. The polyesters may comprise residues of other diester(s) (and/or diacid(s)), and may comprise residues of other polyols as well.

The polymers and copolymers according to the current invention need not be linear. If a polyfunctional aromatic, aliphatic or cycloaliphatic alcohol is used, or part of the diol is replaced by such a polyol, then a branched or even crosslinked polymer may be obtained. A branched or crosslinked polymer may also be obtained when part of the FDCA ester or NDCA ester is replaced by an ester of a polyacid. However, branching would reduce barrier properties, and too much crosslinking would impair film processability. As a result, the polymers should have only a moderate degree of branching or crosslinking, or little to essentially no branching or crosslinking, and preferably have no branching or crosslinking.

When present, the diacids and diesters used in the present invention may comprise FDCA and the $C_1$ to $C_{10}$ alkyl diesters of FDCA, and NDCA and its $C_1$ to $C_{10}$ alkyl diesters. The polymers of the present invention comprise less than 100 mole % FDCA or NDCA, or the $C_1$ to $C_{10}$ alkyl diesters of FDCA or NDCA, based on the total amount of diacid/diester in the polymer. The polymer may be made with up to 98 mole % of the diacid or diester being FDCA or DMF, or NDCA or DMN (or other diester of FDCA or NDCA), or it may be made with as little as 1 mole % of FDCA or DMF or NDCA or DMN. The diacid or diester used to make the polymer may comprise 0.1 to 98 mole % NDCA or DMN, or combinations thereof, and at least 2 mole % of glycolide. The diacids and diesters used to make the polymers of the present invention may further comprise other suitable diacids and diesters. Preferably, the component (a) diacid or diester comprises 2 to 100 mole % glycolide and up to 98 mole % FDCA or NDCA or DMF or DMN (or respective combinations thereof); or 10 to 90 mole % glycolide and 10 to 90 mole % FDCA or NDCA or DMF or DMN (or respective combinations thereof); or 70 to 80 mole % glycolide and 20 to 30 mole % FDCA or NDCA or DMF or DMN (or respective combinations thereof); more preferably, 95 mole % or more of one or more glycolide and 5 mole % or less FDCA or NDCA or DMF or DMN (or respective combinations thereof). In all cases described above, when the diacids FDCA and/or NDCA are present, they are, for practical reasons, only used at low levels, preferably, less than 5 mole %, or less than 2 mole %, or less than 1 mole % based on the total amount of component (a).

Other diacids, diesters, lactones or lactides may be present as well. Suitable di- or polycarboxylic acid esters which can be used in combination with glycolides, or in combinations with glycolides and DMF and/or DMN, include dimethyl terephthalate, dimethyl isophthalate, dimethyl adipate, dimethyl azelate, dimethyl sebacate, dimethyl dodecanoate, dimethyl 1,4-cyclohexane dicarboxylate, dimethyl maleate, dimethyl succinate, and trimethyl 1,3,5-benzenetricarboxylate.

Preferred examples of dicarboxylic acid esters or polycarboxylic acid esters to be used in combination with glycolides, or in combinations with glycolides and DMF and/or DMN, are dimethyl terephthalate, dimethyl adipate, dimethyl maleate, and dimethyl succinate. More preferably, these may be present in a molar ratio of about 10:1 to about 1:10 vis-à-vis the glycolide, DMF and DMN. This mixture of reactants may be referred to as the acid ester reactant.

Preferred examples of lactones to be used in combination with the glycolide alone together with DMF or DMN, are pivalolactone, ε-caprolactone and lactides (L,L; D,D; D,L) and glycolide.

The polymers and copolymers according to the current invention need not be linear. If a polyfunctional aromatic, aliphatic or cycloaliphatic alcohol is used, or part of the dihydroxyl polyol is replaced by a tri- or higher OH-functional polyol, then a branched or even crosslinked polymer may be obtained. A branched or crosslinked polymer may also be obtained when part of the DMF or DMN, when present, is replaced by an ester of a polyacid. Nevertheless, linear polymer and copolymer are preferred.

The polymers of the present invention are made using isosorbide, and the polyol may consist entirely of isosorbide, or may consist essentially of isosorbide. The polyol may comprise isosorbide and other polyol(s). Suitable other polyols may be selected from the group consisting of ethylene glycol, mixtures of 1,3-cyclohexanedimethanol and 1,4-cyclohexanedimethanol, or 2,2,4,4-tetramethyl-1,3-cyclobutanediol, diethylene glycol, 1,2-propanediol, 1,3-propanediol, 1,4-butanediol, 1,5-pentanediol, 1,6-hexanediol, 1,4-benzenedimethanol, 2,2-dimethyl-1,3-propanediol, poly(ethylene glycol), poly(tetrahydofuran), 2,5-di(hydroxymethyl) tetrahydrofuran, glycerol, pentaerythritol, sorbitol, mannitol, erythritol, and threitol. Among those additional polyols which may be used to form the polymers of the present invention, preferred are ethylene glycol, mixture of 1,3-cyclohexanedimethanol and 1,4-cyclohexanedimethanol, 2,2,4,4-tetramethyl-1,3-cyclobutanediol, 1,3-propanediol, 1,4-butanediol, 1,6-hexanediol, 2,2-dimethyl-1,3-propanediol, poly(ethylene glycol), and poly(tetrahydofuran), or combinations thereof.

When the polyol comprises mixtures of 1,3- and 1,4-cyclohexanedimethanol, this polyol component preferably comprises 25 to 75 mole % of 1,3-cyclohexanedimethanol and 25 to 75 mole % of 1,4-cyclohexanedimethanol, based on the total amount of polyol; more preferably, 45 to 65 mole % of 1,3-cyclohexanedimethanol and 35 to 55 mole % of 1,4-cyclohexanedimethanol, based on the total amount of polyol; and still more preferably, 55 mole % of 1,3-cyclohexanedimethanol and 45 mole % of 1,4-cyclohexanedimethanol, based on the total amount of polyol.

The 1,3- and 1,4-cyclohexanedimethanol generally comprise a mixture of cis- and trans- forms of the molecule. Preferably, both the 1,3-cyclohexanedimethanol and 1,4-cyclohexanedimethanol independently comprise 35 mole % cis- and 65 mole % trans-forms of the molecules.

The GLA-based polymers made by the processes described above, or by other known processes for the preparation of polyesters, can be combined to form novel, useful compositions. The novel polymers may be combined with alternate novel polymers, or with known polyesters, or with both alternate novel polymers and known polyesters. The present invention further comprises compositions comprising (1) a first polymer wherein component (a) comprises glycolide, and component (b) consists essentially of isosorbide, (2) and one or more second polymer selected from the group consisting of (A) polymers made from the same classes of reactants, but different reactants from those use to make the first polymer (e.g., isosorbide and glycolide with no or a different set of diesters, depending on what reactants were used in (1)) and (B) other polyesters which are reaction product of component (i) acids, esters or glycolide, and component (ii) polyols, wherein (x) component (i) does not include glycolide when component (ii) is isosorbide, and (y) wherein component (ii) does not include isosorbide when component (i) comprises glycolide.

The composition may comprise at least one first polymer which is the reaction product of glycolide and at least one second polymer is the reaction product of glycolide and one or more $C_1$ to $C_{10}$ alkyl ester of FDCA or NDCA different from any such ester or combination of esters present in the first polymer. The composition may comprise one or more other polyester which comprise a reaction product of component (i) and component (ii), where component (i) is selected from the group consisting of FDCA, one or more $C_1$ to $C_{10}$ alkyl ester thereof, NDCA, $C_1$ to $C_{10}$ alkyl ester thereof, glycolide or combinations thereof, and component (ii) is one or more polyol comprising a mixture of 1,3-cyclohexanedimethanol and 1,4-cyclohexanedimethanol, or 2,2,4,4-tetramethyl-1,3-cyclobutanediol, or combinations thereof. Since the polyol component contains a mixture of 1,3- and 1,4-cyclohexanedimethanol, or 2,2,4,4-tetramethyl-1,3-cyclobutanediol, it cannot be solely isosorbide or ethylene glycol. To be an "other polyester", when component (i) is glycolide, component (ii) does not include isosorbide.

The other polyester used in forming the compositions may also be one or more known polyesters, conventional or otherwise, including, but not limited to, aliphatic homopolymer polyglycolide (also known as "polyglycolic acid") (PGA), polylactide (also known as "polylactic acid") (PLA), polycaprolactone (PCL), copolymer polyethylene adipate (PEA), polyhydroxyalkanoate (PHA), polyethylene terephthalate (PET), semi-aromatic copolymer PET, polybutylene terephthalate (PBT), polytrimethylene terephthalate (PTT), polyethylene naphthalate (PEN), and aromatic copolymers from polycondensation of 4-hydroxybenzoic acid and 6-hydroxynaphthalene-2-carboxylic acid.

The invention further includes articles comprising one or more GLA-based polymers, or compositions containing them. The polymers and compositions containing the polymers may contain other components such as plasticizers, softeners, dyes, pigments, antioxidants, stabilizers, fillers and the like. Examples of articles include, but are not limited to, thermoformed articles, film, shrink label, retortable packaging, pipe, bottle, profile, molded article, extruded article, fiber, and fabric. Rigid or semi-rigid (i.e., somewhat deformable) bottles and various rigid articles may be made using conventional blow-molding processes well-known in the art. The polymers may be used in forms of application where currently PET, or PEF, or similar polyesters are used.

The invention further includes methods of forming films or sheets comprising the steps of (i) extruding a polymer to form an extrudate; (ii) shaping the extrudate by passing it through a flat or annular die; and (iii) cooling the extrudate to form a film or sheet having a machine direction and a cross direction; wherein the polymer comprises reaction product of (a) one or more diacid or diester thereof, and (b) one or more polyol, wherein component (a) comprises glycolide, and component (b) consists essentially of isosorbide. The method may comprise the further step of orienting the film or sheet in the machine or cross direction, or both. The polymer resin may be processed according to standard processes applicable to other polyesters such as PET and PEF. When the resulting film or sheet is oriented in both the machine and cross directions, such orientation may be imparted sequentially or simultaneously. The barrier film thickness typically ranges from 1 µm to 350 µm.

The invention further includes a film or sheet of one or more layers, wherein at least one layer comprises polymer comprising the reaction product of (a) one or more diacid, diester thereof, or glycolide, and (b) one or more polyol, wherein component (a) comprises glycolide, and component (b) consists essentially of isosorbide. Such multilayer films may be prepared according to standard processes applicable to other polyesters such as PET and PEF.

Films and resins made from the polymers and compositions of the present invention exhibit a desirable balance of properties, relative to PEF polymers, including improved oxygen, carbon dioxide, and water-vapor permeability, higher glass transition temperature (Tg), and improved chemical, heat and impact resistance. In addition, these polymers can used to form films with high-temperature heat sealability using alternative sealing technologies.

These films and resins may be used for various applications which benefit from the combination of properties described above, such as shrink labels, bottles for beverages and other fluids, high-barrier film applications for conventional (i.e., for use in less demanding applications than retort) and retortable packaging, hot-fill packaging, and high-heat (i.e., dry heat) applications, such as oven-proof packaging. These films and resins can be used to form packaging for applications generally served by PET films without the need for additional barriers layers needed with PET-based systems. At similar thicknesses as PET food packaging films, the films and resins of the present invention can be used for long shelf-life packaging for food products and pharmaceuticals, or alternatively can be used at down-gauged levels for food packaging and pharmaceuticals with performance comparable to conventional (but thicker) PET-based systems. These films and resins can be used to form transparent packaging that can provide UV-blocking for food, pharmaceutical and other applications.

The polymer can also be used in tape applications, such as the carrier for magnetic tape or backing for pressure sensitive adhesive tapes, for packaging trays and blister packs. The polymer can also be used as substrate in thin film and solar cell applications.

The polymer may be used formed into injection molded articles, extruded sheets, profile extruded articles and extruded blow molded articles. The polymers may be used in applications including, but not limited to, medical packaging, shrink labels, rigid laminates (e.g., for furniture), transaction cards (e.g., credit cards), bottles (including so-called clear handleware), housewares, appliances, equipment, and signage.

Films and resins of the present invention can be used to form multilayer packaging systems. Because of the high barrier properties (vis-à-vis oxygen, $CO_2$ and moisture), such multilayer systems can be made without metal foil or metalized polymeric film layers. This enables the construction of transparent or substantially transparent packaging films, a desirable opportunity for marketing food and other products. For example, the invention barrier films may comprise a polyester-based polymer with (a) an $O_2$ gas permeability of 0.4 cc-mil/100 in.$^2$ 24 hrs atm (7.9 cc 20 µm/m$^2$ 24 hrs atm) at 50% relative humidity (ASTM D-3985) or less, (b) a moisture permeability of 0.5 g mil/100 in.$^2$ 24 hrs atm (9.8 g 20 µm/m$^2$ 24 hrs atm) at 38° C. (ASTM F-1249) or less, and (c) a glass transition temperature (Tg) of 100° C. or higher. The barrier film may further have (x) a Falling dart drop impact (Type A) of 200 g for a 50 µm thick film material at room temperature and 50% relative humidity (ASTM D-1709) or greater, (y) an Elmendorf tear of 400 g for a 50 µm thick film material at room temperature and 50% relative humidity (ASTM D-1922) or greater, or (z) a notched Izod impact of 1.0 J/cm at room temperature and 50% relative humidity (ASTM D-256 for rigid materials) or greater, or combinations thereof. Preferably, the film has properties (a), (b) and (c), and one or more of properties (x), (y) and (z). Such polymers are particularly suitable for food, industrial, consumer, pharmaceutical, medical, and electronic and electronic component packaging applications.

The barrier films may preferably comprise a polyester-based polymer with (a) an $O_2$ gas permeability of 2.5 or less, 2 or less, 1 or less, or 0.5 cc-mil/100 in.$^2$ 24 hrs atm or less (5 or less, 4 or less, 2 or less, or 1 cc 20 µm/m$^2$ 24 hrs atm or less) at 50% relative humidity, (b) a moisture permeability of 0.3 or less, 0.2 or less, or 0.1 g mil/100 in.$^2$ 24 hrs atm or less (6 or less, 4 or less, or 2 g 20 µm/m$^2$ 24 hrs atm or less) at 38° C., and (c) a Tg of 110° C. or higher, or 120° C. or higher, or 100 to 150° C., or 110 to 150° C., or 120 to 150° C.

The barrier film may preferably have (x) a Falling dart drop impact (Type A) of 250 or greater, or 300 or greater, or 500 g or greater for a 50 µm thick film material at room temperature and 50% relative humidity, (y) an Elmendorf tear of 450 or greater, or 500 or greater, or 600 g or greater at room temperature and 50% relative humidity, or (z) a notched Izod impact of 1.5 or greater, or 2.0 or greater, or 2.5 or greater, or 3.0 J/cm or greater at room temperature and 50% relative humidity, or combinations of (x), (y) and (z).

Each of the various figures for the barrier, Tg and toughness properties described in the preceding three paragraphs may be independently combined to describe films within the scope of the present invention. Merely as an illustration of that point, as one example, the barrier film of the present invention may comprise a polyester-based polymer with (a) an $O_2$ gas permeability of 2.5 cc-mil/100 in.$^2$ 24 hrs atm (5 cc 20 µm/m$^2$ 24 hrs atm) or less at 50% relative humidity, (b) a moisture permeability of 0.5 g mil/100 in.$^2$ 24 hrs atm (9.8 g 20 µm/m$^2$ 24 hrs atm) or less at 38° C., and (c) a Tg of 120° C. or higher; and that barrier film may further have (x) a Falling dart drop impact (Type A) of 250 g or greater for a 50 µm thick film material at room temperature and 50% relative humidity, (y) an Elmendorf tear of 600 g or greater at room temperature and 50% relative humidity, and (z) a notched Izod impact of 3 J/cm or greater at room temperature and 50% relative humidity. This illustrates the point that the barrier film may satisfy any combination of the stated measures for properties (a), (b) and (c), and that it may comprise those properties alone or further in combination with one or more of the properties (x), (y) or (z) ,and any combination of the stated properties for properties (x), (y) and (z).

The polymer may form a film with similar or lesser barrier properties as described above, but with one or more of the following properties indicating toughness:
(a) a Falling dart drop impact (Type A) of 200 g for a 50 µm thick film material at room temperature and 50% relative humidity (ASTM D1709) or greater;
(b) an Elmendorf tear of 400 g for a 50 µm thick film material at room temperature and 50% relative humidity (ASTM D-1922) or greater; or
(c) a notched Izod impact of 1.0 J/cm at room temperature and 50% relative humidity (ASTM D-256 for rigid materials) or greater; or combinations thereof.

The following examples illustrate the present invention.

EXAMPLES

A typical synthesis procedure could be as follows:

The polymerization with glycolide, as an internal cyclic ester, with the desired diols or polyols can be carried out following the procedures described in the literature (Chem. Rev. 2004, 104, 6147-6176; Chem. Rev. 2007, 107, 5813-5840; J. Polym. Sci. Part A: Polym. Chem., 2009, 47, 1440-1449), with the exception of the choice of polyols as the inventive step to achieve desired characteristics claimed in this patent application.

The catalysts used in the ring opening polymerization are Sn (II) octoate or a super base catalyst or a cationic catalyst. When glycolide is used in combination with a lower molecular weight diester such as DMF, DMN, etc., provision to remove methanol or other alcohols is made through the application of vacuum to drive the equilibrium to higher conversion of transesterification process, followed by the polycondensation, including solid state polymerization, to increase the molecular weight as desired. The two mechanisms of polymerization can occur simultaneously.

| Example | Glycolide/Diester | Required Polyol | Other Polyol | Equivalent % Ethylene glycol in polyol blend |
|---------|-------------------|-----------------|--------------|----------------------------------------------|
| 1 | Glycolide | Isosorbide | | |
| 2 | Glycolide/DMN (1:1 equiv ratio) | Isosorbide | | |
| 3 | Glycolide | Isosorbide | Ethylene Glycol | 2 |
| Comp. 1 | Glycolide | | Ethylene Glycol | |
| Comp. 2 | Glycolide | | Isosorbide/ Ethylene Glycol | 75 |

The comparative example incorporates glycolide and excess ethylene glycol in the process of the above example.

Analytical: MW Measurements:

HPLC by Waters.

Detector: A differential refractometer

Eluent: A 5-Mm solution of sodium trifluoroacetate in hexafluoroisopropanol

Flow rate: 1.0 ml/min

Column Temperature: 40° C.

Standard: Polymethyl methacrylate (PMMA) resin.

Forming the Film

The polyester-based polymers with the compositions as described in the preparations above may be formed into biaxially-oriented films as follows:

the polymer is sufficiently dried and extruded onto casting drum (provides smooth surface to plastic film).

the resulting film is stretched 2 to 7 times in both the forward and transverse directions, either in a simultaneous process or sequentially Sequential Draw process: the film's forward draw is over a series of precision motorized rollers; transverse or sideways draw uses diverging clips in a multiple zoned oven with tightly controlled temperatures Simultaneous Draw process: the film is drawn using precision controlled simultaneously diverging, and accelerating clips through a multiple zoned oven with tightly controlled temperatures tension and temperatures are maintained properly to ensure final quality of the film the film is wound into large master rolls, which can optionally be slit to precision widths the film thickness typically ranges from 1 µm to 350 µm.

What is claimed is:

1. A polymer comprising the reaction product of (a) (i) glycolide and (ii) 2,5-furan dicarboxylic acid (FDCA), one or more $C_1$ to $C_{10}$ alkyl diester thereof, 2,6-napthalene dicarboxylic acid (NDCA), $C_1$ to $C_{10}$ alkyl diester thereof, or combinations thereof, and (b) a polyol, wherein the polyol consists of isosorbide.

2. The polymer of claim 1 wherein component (a) comprises 2 to 98 mol.%, based on the total weight of component (a), of glycolide, and 2 to 98 mol.%, based on the total amount of component (a), of $C_1$ to $C_{10}$ alkyl diesters of FDCA or NDCA, or combinations thereof.

3. A composition comprising a first polymer of claim 1 and one or more second polymer selected from the group consisting of (A) polymers of claim 1 different from the first polymer and (B) other polyesters which are reaction product of component (i) acids, esters or glycolide, and component (ii) polyols, wherein (x) component (i) does not include glycolide when component (ii) is isosorbide, and (y) wherein component (ii) does not include isosorbide when component (i) comprises glycolide.

4. The composition of claim 3 wherein at least one first polymer is the reaction product of glycolide with or without one or more $C_1$ to $C_{10}$ alkyl diesters of FDCA or NDCA, and at least one other polymer is the reaction product of glycolide and one or more $C_1$ to $C_{10}$ alkyl diesters of FDCA or NDCA different from the diesters (if any) or combination of diesters (if any) present in the first polymer.

5. The composition of claim 3 wherein the other polyester (B) comprises a reaction product of component (i) and component (ii), where component (i) is selected from the group consisting of FDCA, one or more $C_1$ to $C_{10}$ alkyl diester thereof, NDCA, $C_1$ to $C_{10}$ alkyl diester thereof, or glycolide, or combinations thereof, and component (ii) is one or more polyol comprising a mixture of 1,3-cyclohexanedimethanol and 1,4-cyclohexanedimethanol, or 2,2,4,4-tetramethyl-1,3-cyclobutanediol, or combinations thereof; provided that when component (i) comprises glycolide, component (ii) does not include isosorbide.

6. The composition of claim 3 wherein the other polyester comprises aliphatic homopolymer polyglycolide or polyglycolic acid (PGA), polylactic acid (PLA), polycaprolactone (PCL), copolymer polyethylene adipate (PEA), polyhydroxyalkanoate (PHA), polyethylene terephthalate (PET), semi-aromatic copolymer PET, polybutylene terephthalate (PBT), polytrimethylene terephthalate (PTT), polyethylene naphthalate (PEN), and aromatic copolymers from polycondensation of 4-hydroxybenzoic acid and 6-hydroxynaphthalene-2-carboxylic acid.

7. An article comprising one or more polymers of claim 1.

8. A film or sheet of one or more layers, wherein at least one layer comprises polymer comprising the reaction product of (a) (i) glycolide and (ii) 2,5-furan dicarboxylic acid (FDCA), one or more $C_1$ to $C_{10}$ alkyl diester thereof, 2,6-napthalene dicarboxylic acid (NDCA), $C_1$ to $C_{10}$ alkyl diester thereof, or combinations thereof, and (b) a polyol, wherein the polyol consists of isosorbide.

9. A method of forming a film or sheet comprising:
   (i) extruding a polymer to form an extrudate;
   (ii) shaping the extrudate by passing it through a flat or annular die such that the extrudate has a machine direction and a cross direction; and
   (iii) cooling the extrudate;
wherein the polymer comprises the reaction product of (a) (i) glycolide and (ii) 2,5-furan dicarboxylic acid (FDCA), one or more $C_1$ to $C_{10}$ alkyl diester thereof, 2,6-napthalene dicarboxylic acid (NDCA), $C_1$ to $C_{10}$ alkyl diester thereof, or combinations thereof, and (b) a polyol, wherein the polyol consists of isosorbide.

10. The method of claim 9 comprising the further step of orienting the film or sheet in the machine or cross direction, or both.

* * * * *